(12) United States Patent
Brisiel et al.

(10) Patent No.: US 7,113,920 B1
(45) Date of Patent: Sep. 26, 2006

(54) ELECTRONIC STOCKROOM AND CATALOG

(75) Inventors: William Russell Brisiel, Newport News, VA (US); Eric Gordon Cooper, Yorktown, VA (US); Mark Edward Davis, Newport News, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 1222 days.

(21) Appl. No.: 09/690,055

(22) Filed: Oct. 16, 2000

(51) Int. Cl.
*G06Q 30/00* (2006.01)
(52) U.S. Cl. .......................... 705/27; 705/26
(58) Field of Classification Search ................. 705/26, 705/27, 28
See application file for complete search history.

(56) References Cited

U.S. PATENT DOCUMENTS

| | | | | |
|---|---|---|---|---|
| 5,319,542 A | * | 6/1994 | King et al. | 705/27 |
| 5,870,717 A | * | 2/1999 | Wiecha | 705/26 |
| 5,970,475 A | * | 10/1999 | Barnes et al. | 705/27 |
| 6,023,683 A | * | 2/2000 | Johnson et al. | 705/26 |
| 6,418,416 B1 | * | 7/2002 | Rosenberg et al. | 705/28 |

FOREIGN PATENT DOCUMENTS

JP     411205585 A   *   7/1999

OTHER PUBLICATIONS

Roberts, Bill, The supply chain, simplified via the web, dated, Oct. 15, 1999.*

* cited by examiner

Primary Examiner—Mark Fadok

(57) ABSTRACT

An intranet based comprehensive ordering system that allows authorized employees to simultaneously search many different vendor's catalogs that are stored in a server on a company's intranet. The present Electronic Stockroom and Catalog (ESAC) allows vendors to download their catalogs to the system for storage, browsing and possible purchase by authorized employees. ESAC also allows vendors to update catalogs that may already be in the system. ESAC stores the catalogs and provides the employee with the ability to easily search all of the vendors catalogs for desired items. Thus, employees have access to a wide variety of items. The present system is an attempt at providing the company with one-stop-shopping for every item that every employee will ever need in the course of their employment. If the desired item is available on-site i.e., in one of the stockrooms of the company, then ESAC informs the employee and provides location information relating to the desired item. If the desired item is not available on-site, then the item can be electronically ordered from a vendor. Generally speaking, the ESAC operates within the security of a company firewall and access is not available to unauthorized personnel or to the general public that may try to access ESAC via the Internet.

10 Claims, 3 Drawing Sheets

ELECTRONIC STOCKROOM AND CATALOG

BACKGROUND OF THE INVENTION

The present invention relates generally to the field of electronic commerce and more specifically to a method of optimizing the purchasing process within a centralized or dispersed company or organization.

It is common for businesses to keep a stockroom of items that are required for their daily activities. For most businesses, these stocked items consist mainly of paper products and business machine refills: notepads, computer paper, printer ink cartridges and toner for copy machines. Such stockrooms may also include other items like paperclips and staples however, they do not include all of the items the entire business will need for production of its product or service. In order to acquire all of the materials a business needs, usually a purchaser or other employee must refer to one or more vendor catalogs.

Business product catalogs come in many different shapes, sizes and in regards to computer related item, formats. In order to stay competitive and to take advantage of electronic commerce most vendors and producers have made their product catalogs available in some electronic form. These electronic catalogs may come in the form of a Compact Disc (CD) that can be distributed to customers or the catalog information may be stored in a server that customers can access via the Internet.

In both of these cases a vendor must invest money in the production of the electronic catalogs. All of the vendor's product information must first be stored in electronic format. Then the information must be stored on a CD or in the memory of a server. In the case of a CD, the vendor must pay for mass copying of the CD followed by mass distribution, which includes gathering address information on potential customers and postage charges. When the vendor is ready to publish a new catalog, or just wants to make changes to a few items in the old catalog, the vendor must make, copy and distribute an entirely new CD. If the vendor chooses to put their catalog on-line, then they must involve themselves in setting up a website and absorb all of the costs associated with establishing and maintaining the website.

Websites typically reside on the World Wide Web, in a server for example, that is accessed via the Internet from a remote location. Multimedia documents found on the World Wide Web are called Web pages. Linking information together with hyperlinks is accomplished by special computer programs or computer languages. Computer languages used to create Web pages are HyperText Markup Language (HTML) and JAVA. A multimedia device should have a keyboard and a pointing device, such as a mouse or pen, so that the user can direct the associations between multimedia elements.

Photographs, drawings, and other still images must be changed into a format that the computer can manipulate and display. Such formats include bit-mapped graphics and vector graphics. Bit-mapped graphics store, manipulate, and represent images as rows and columns of tiny dots. In a bit-mapped graphic, each dot has a precise location described by its row and column, much like each house in a city has a precise address. Some of the most common bit-mapped graphics formats are called Graphical Interchange Format (GIF), Tagged Image File Format (TIFF), and Windows Bitmap (BMP). Vector graphics use mathematical formulas to recreate the original image. In a vector graphic, the dots are not defined by a row-and-column address, rather they are defined by their spatial relationships to one another. Because their dot components are not restricted to a particular row and column, vector graphics can reproduce images more easily and thus provide better output on most video screens and printers. Common vector graphics formats are Encapsulated Postscript (EPS), Windows Metafile Format (WMF), Hewlett-Packard Graphics Language (HPGL), and Macintosh graphics file format (PICT).

A modem, which stands for modulator-demodulator, is the device that connects a computer to a telephone line and allows information to be transmitted to or received from another computer. Each computer that sends or receives information must be connected to a modem. The information sent from one computer is converted by the modem into an audio signal, which is then transmitted by telephone lines to the receiving modem, which converts the signal into information that the receiving computer can understand. Handshaking is the term used for the signal acknowledging that communication or the transfer of information can take place. Handshakes can be controlled by either hardware or software.

The Internet and most intranets are based on the concept of a client-server relationship between computers, also called a client/server architecture. To access information on the Internet or an intranet, a user must first log on, or connect, to the client computer's host network. This connection can be established with or without user intervention depending on the software. Once a connection has been established, the user may request information from or send information to a remote server. If the information requested by the user resides on one of the computers on the host network, that information is quickly retrieved and sent to the user's terminal. If the information requested by the user is on a server that does not belong to the host Local Area Network (LAN), then the host network connects to other networks until it makes a connection with the network containing the requested server. In the process of connecting to other networks, the host may need to access a router, a device that determines the best connection path between networks and helps networks to make connections. Once the client computer makes a connection with the server containing the requested information, the server sends the information to the client in the form of a file. A special computer program called a browser enables the user to view the file. Examples of Internet browsers are Mosaic, Netscape, and Internet Explorer. Non-multimedia documents do not need browsers to view their text-only contents and many multimedia documents provide access to text-only versions of their files. The process of retrieving files from a remote server to the user's terminal is called downloading. The process sending files to a remote server from a user's terminal is called uploading.

No matter what electronic format a vendor chooses, CD or website, each is flawed, in that neither one can fulfill all of the needs of all of the employees of a given company or organization. It is virtually impossible for a medium or large sized company to find one vendor's catalog that can provide all of the products that are required by that medium or large company.

SUMMARY OF THE INVENTION

According to the preferred embodiment, an intranet based comprehensive ordering system is provided that allows authorized employees to search from multiple vendor/manufacture catalogs that are stored in a server on a company's intranet. The present Electronic Stockroom and Catalog (ESAC) allows vendors to download their catalogs to the system for storage, browsing and possible purchase by authorized employees. ESAC also allows vendors to update catalogs that may already be in the system. ESAC stores the catalogs and provides the employee with the ability to simultaneously search all of the vendors catalogs for desired items. Thus, employees have access to a wide diversity of items. The present system is an attempt at providing the company with one-stop-shopping for every item that every employee will ever need in the course of their employment. If the desired item is available on-site i.e., in one of the stockrooms of the company, then ESAC informs the employee and provides location information relating to the desired item. Items for sale are browsed via a friendly ESAC interface that allows the employee to search for items using keywords, part numbers and other search methods, such as hierarchical for example. If the desired item is not available on-site, then the item can be ordered from a vendor. Generally speaking, the ESAC operates within the security of a company firewall and access is not available to unauthorized personnel or the general public who may try to access ESAC via the Internet.

BRIEF DESCRIPTION OF THE DRAWINGS

The preferred embodiment will now be described in more detail with reference to the accompanying drawings, given only by way of example, in which.

DETAILED DESCRIPTION OF THE INVENTION

The present Electronic Stockroom and Catalog (ESAC) embodies the notion of a comprehensive distributor by providing access to products both within a company and outside the company, while operating within the safety of a secure corporate firewall. Because of the security provided, the preferred embodiment enjoys full integration with corporate budget, finance and accounting systems, while retaining all the benefits of having access to the Internet. Integration with other company files allows automated budget tracking, payment for purchases and other desired accounting.

Figure 1:
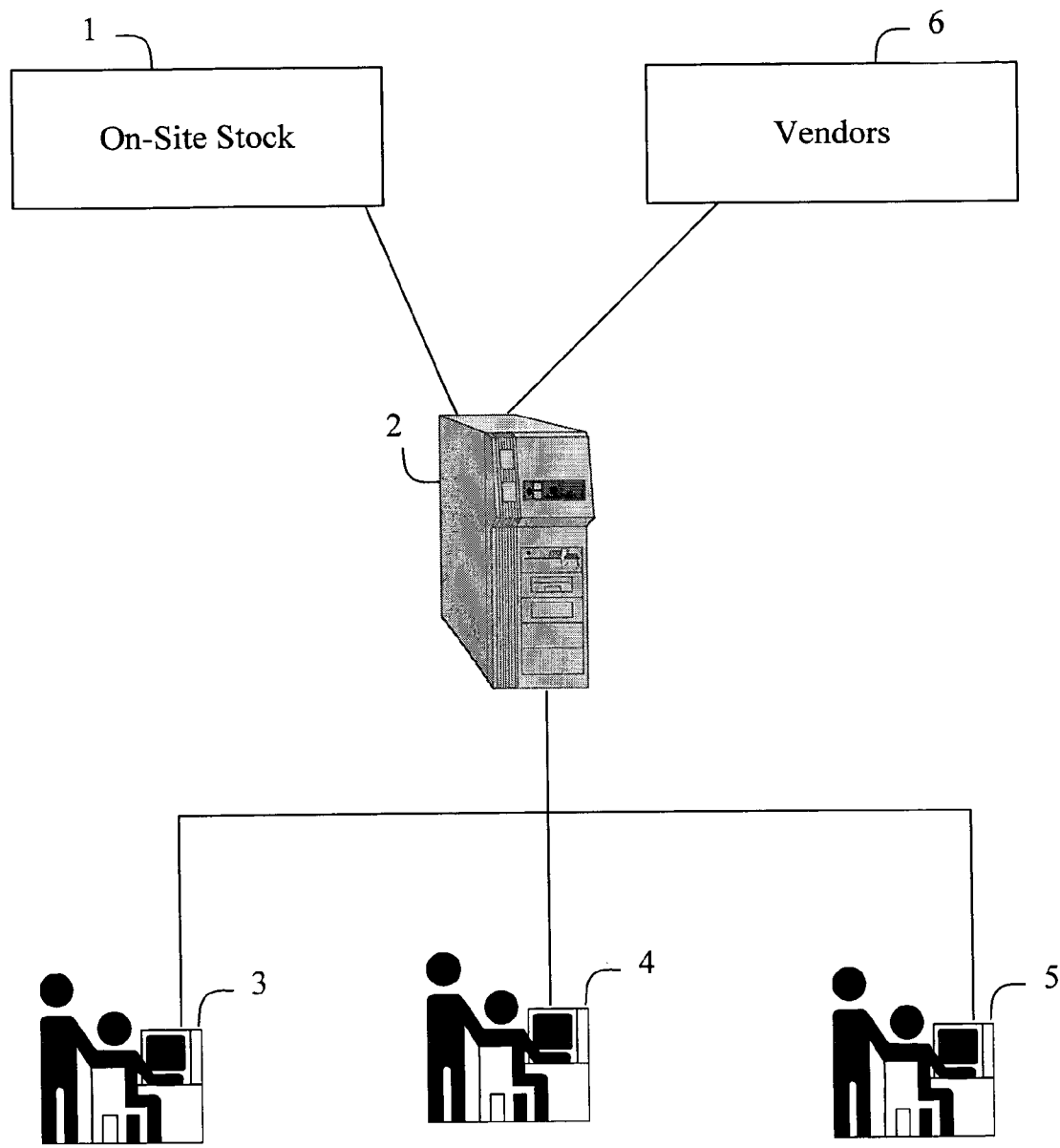
FIG. 1 is a generalized block diagram of the preferred embodiment.

FIG. 1 shows employee(s) 3–5 of a company using the preferred embodiment. Each of the employees 3–5 has determined that it is necessary to locate or purchase an item that is needed in the course of their business. Employees 3–5 may be within the same building or dispersed throughout several buildings. In both cases their terminals are connected by a LAN that makes up the company's intranet. Server 2 stores and executes the Electronic Stockroom and Catalog (ESAC) program. The server 2 is physically located within one of the company's buildings and electrically connected to each ESAC terminal. The ESAC stores information about the inventory of the company's stockroom(s) 1 as well as electronic catalogs from various outside vendors 6, thus providing the employees with one stop shopping in regards to their business related shopping. Employee 3 may be looking for non-standard sized folders that the company has used before. She may think there are some on-site but is unsure. ESAC's interface guides her through Paper Products, to Folders, to specific sizes of folders. If the item is available on-site then she is given location information. If the item is not available on-site then she can place an order for the desired item. Employee 4 may be looking for parts for a large piece of electronic equipment. Even though it may be unlikely that the parts will be available on-site, ESAC will still check to make sure and then proceed with ordering from a vendor if the parts are not found on-site. Once a purchase order for desired item(s) is prepared, the order is sent to the specified vendor over the Internet. ESAC establishes a connection to the Internet and sends the order in the form of a message to the vendor. Status and confirmation messages may be exchanged between ESAC and the vendor. In the preferred embodiment, ESAC is not connected to the Internet on a full time basis. Outgoing Internet messages and files may be buffered within server 2 and sent at a later time. Similarly, incoming Internet messages and files may be buffered, in another server for example, and retrieved at a later time.

Figure 2:
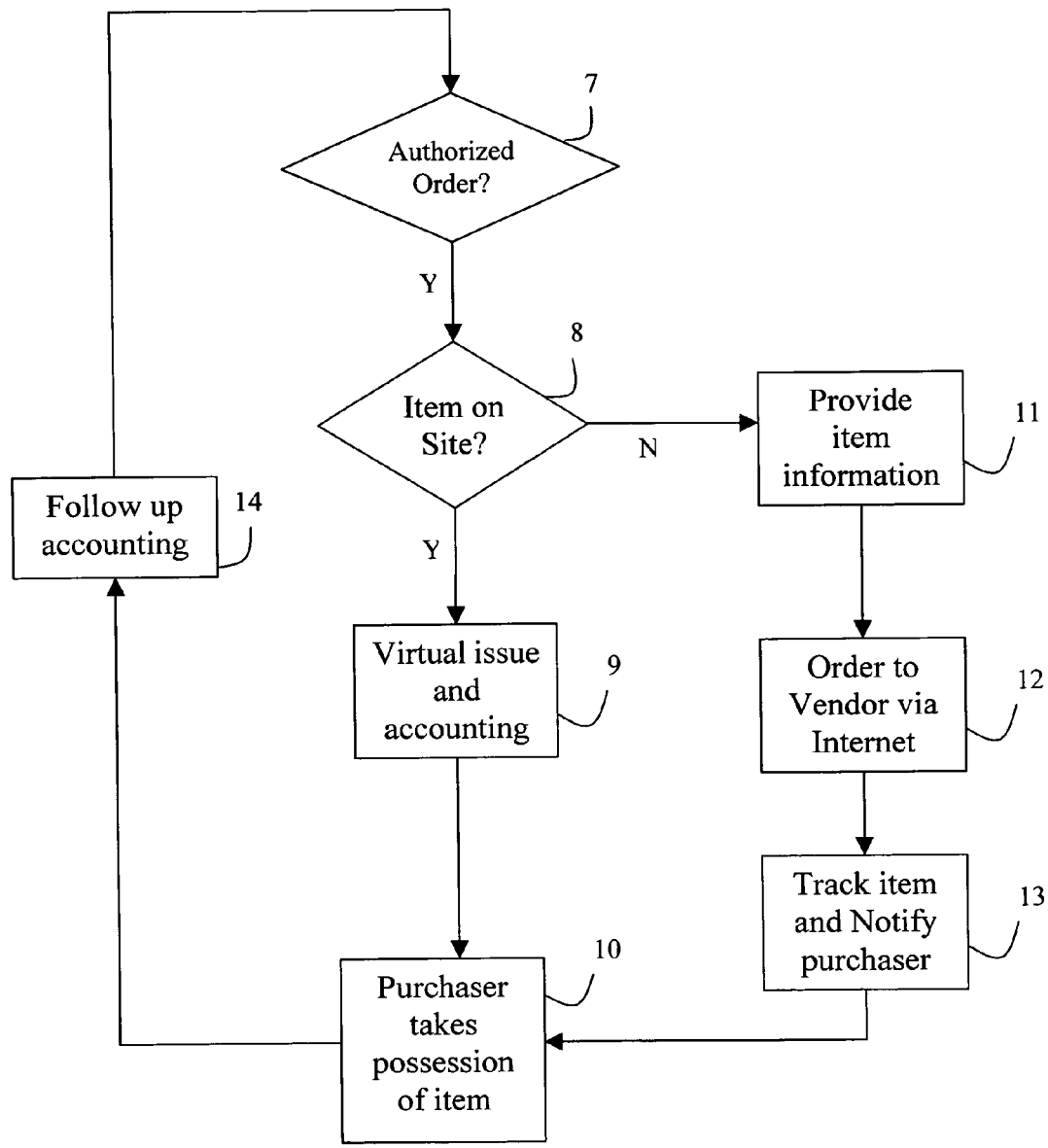
FIG. 2 is a general flow chart for the preferred embodiment.

FIG. 2 is a generalized flow chart for the preferred embodiment. In the first step 7, an ESAC Authorization software module ensures that the customer is an employee of the company and is authorized to make purchases. The Authorization module can also screen potential customers according to cost centers, budget limitations, single purchase amount and others, in accordance with the company's requirements. After the customer has passed some or all of the authorization tests, they search for the desired item or enter known information about the item to narrow their search and subsequently find the item within ESAC. Items may be searched by name, key word, part number, by manufacturer or other searchable categories. The search proceeds in a hierarchical manner that efficiently leads the customer to the desired item. Once the desired item is found, ESAC determines if the item is physically located in any of the stockrooms of the company, step 8. If the item is "on hand", then specific location information is provided to the customer and a virtual "issue" to the customer is processed, step 9. In the virtual issue, the on-hand balance is reduced and all financial accounting is accomplished, such as appropriate adjustment of a budget and automatic re-ordering, for example. If it is determined that the desired item is not available on-site, then further information will be entered, step 11, so that the item can be ordered from a vendor. A feature of the present invention is that vendors download their electronic catalogs directly into ESAC. This direct access allows vendors to easily update their catalogs with minor changes. Further, since the customer, or other company employee, is guided by the ordering instructions of the vendor, it is guaranteed that the customer will know all of the information that is required in order to procure the item. Once an order form is filled out, ESAC accesses the Internet and sends the order to the vendor, step 12. After the order is sent, ESAC is disconnected from the Internet. This limited exposure to the Internet aids in providing security to the present intranet based system. Electronic communications that are sent to and received from the Internet are done so in a manner similar to an e-mail message. Messages that are passed between ESAC and vendors can be buffered so that constant connection to the Internet is not required. At step 13, status messages are passed between ESAC and the vendor, and when the item is received at the company, the customer is notified. At step 10, the purchaser takes physical custody of desired item and goes away happy. Step 14 indicates the initiation of any required follow up accounting such as dropping a received item from a list of back-ordered items, for example.

The preferred embodiment allows the customer to order more than one item and from more than one vendor's catalog. This virtual one-stop-shopping is accomplished by providing ESAC with multiple vendor account code capabilities. If there are budget limitations based on the vendor, cost center, particular customer or otherwise, ESAC takes those limitations into consideration during the purchasing process. A user friendly interface provides messages to the customer regarding availability of the desired item(s) and informing them of any authorization or other problems with their order.

Figure 3:
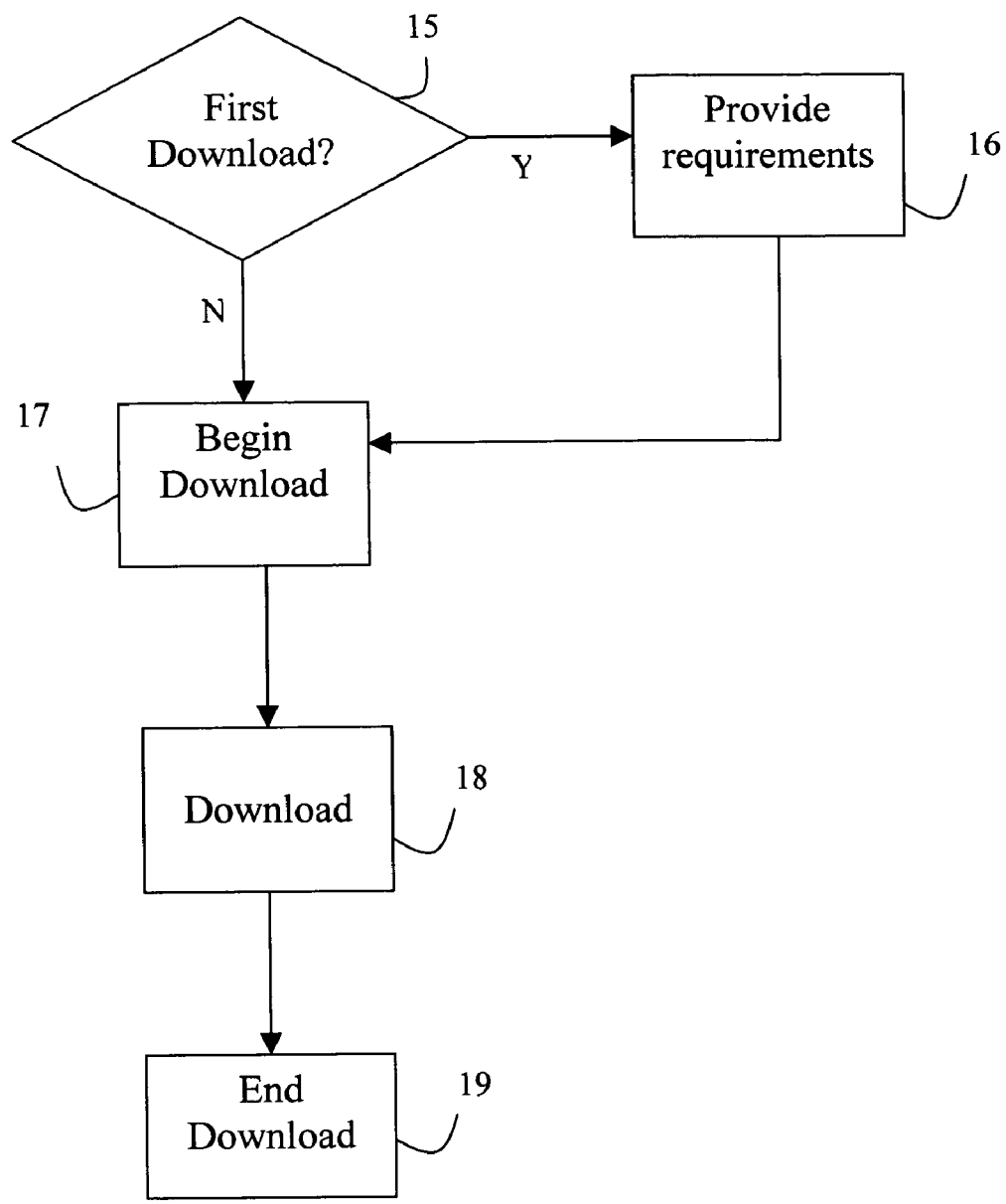
FIG. 3 is flow chart for the vendor catalog download process.

FIG. 3 illustrates the steps that a vendor follows when downloading a catalog to ESAC. Of course the vendor can always mail a computer disk, or other storage medium, to the company that contains the vendor's catalog. If a vendor does mail a disk to the company, then a company employee would load the vendor's catalog to ESAC. However, by taking advantage of electronic downloads directly to ESAC, vendors can save considerable time, money and effort. At step 15, new vendors are identified and transferred to step 16. Vendors that have downloaded catalog information previously skip step 16 and go directly to step 17. Those new vendors that are transferred to step 16 are provided with company requirements such as formats and passwords, as well as any other required information. The company also receives information from the vendor, in step 16, so that the host company is able to establish an account for the vendor. This step need only be done once. After step 16 is complete, the vendor is transferred to step 17 to begin the download. This is the second time that ESAC must connect to the Internet; the first time being when sending a purchase message to a vendor. The vast majority of the time, ESAC is not connected to the Internet. When ESAC is connected to the Internet, security is provided to prevent unauthorized users that are active on the Internet from accessing the ESAC system. Returning to step 17, download begins by the vendor establishing a connection to the Internet, viewing a company related interface, such as a website, and gaining access to ESAC via a download feature on the interface. In step 18, the vendor designates the catalog information to be transferred and initiates the electronic transfer to ESAC. The catalog information can be received directly by ESAC, if ESAC is also connected to the Internet. Otherwise, the information is buffered outside of ESAC, in another server that is always available on the Internet, for example. If the catalog information is sent to another server, then the information is retrieved and stored by ESAC at a later time. In either case, the download is viewed as a successful download by the vendor. In step 19, the vendor is provided with a confirmation notice of a successful download. If the download was directly to ESAC, then the catalog is available for searching and subsequent ordering, immediately. If the download was buffered, then it is made available for searching immediately after it is retrieved and stored in ESAC.

The preferred embodiment provides a time and money saving advantage to vendors by letting them quickly and inexpensively update their catalogs with new items and/or prices. Further, by allowing the storage and searching of multiple vendors, the preferred embodiment allows virtual one-stop-shopping for every item that every employee within a specified company will need.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

We claim:

1. A method of storing, searching and purchasing a wide variety of items from
an intranet based electronic stockroom and catalog (ESAC) comprising the steps of:
    housing the ESAC in a server that operates on a secure company intranet wherein the ESAC can be accessed by authorized employees at one or more terminals;
    storing on-site inventory information and vendor catalog information in the ESAC;
    allowing multiple vendors to download their catalog information to the ESAC for initial loading of their catalogs or updating of their catalogs;
    providing search capabilities for simultaneous searching, by authorized employees, of the multiple vendor catalogs and items that are available on-site; and
    integrating ESAC functions with other company electronic files for budgeting, accounting and authorization limitations are implemented in the purchasing process and tracking of purchases is possible.

2. The method of claim 1 wherein, the step of allowing comprises permitting the vendors to download their catalog information via the Internet to the ESAC and the catalog information includes text and image information.

3. The method of claim 1 wherein, the step of providing search capabilities comprises providing keyword, part number, manufacturer or other descriptor search mechanisms.

4. The method of claim 1 wherein, the step of integrating comprises associating budgeting, accounting and authorization information with each employee and/or group of employees and automatically updating this information upon purchases and/or issues that are made.

5. The method of claim 1 wherein, the step of integrating comprises associating an order for an item with an employee placing the order and notifying the employee when the item is received.

6. A system of storing, searching and purchasing a wide variety of items from
an intranet based electronic stockroom and catalog (ESAC) comprising:
    an ESAC program that is executed on a server that operates on a secure company intranet, wherein the ESAC is accessed by authorized employees at one or more company terminals;
    on-site inventory information and multiple vendor catalog information that is stored in ESAC wherein, the vendors are allowed to download their catalog information to ESAC, both for initial loading of their catalog and for updating of their catalog information;
    means for for simultaneous searching of the multiple vendor catalogs and items that are available on-site; and
    ESAC functions that provide integration of ESAC files with other company electronic files of budgeting, accounting and authorization limitations are implemented with each purchase and tracking of purchases.

7. The system of claim 6 wherein, the vendors can download their catalog information via the Internet to ESAC and the catalog information includes text and image information.

8. The system of claim 6 wherein, the search capabilities provide keyword, part number, manufacturer or other descriptor search mechanisms.

9. The system of claim 6 wherein, budgeting, accounting and authorization information is associated with each employee and/or group of employees and the budgeting, accounting and authorization information is automatically updated with each purchase and/or issue.

10. The system of claim 6 wherein, the step of integrating comprises associating an order for an item with an employee placing the order and notifying the employee when the item is received.

* * * * *